(12) United States Patent
Yamashita et al.

(10) Patent No.: US 11,105,775 B2
(45) Date of Patent: Aug. 31, 2021

(54) INSPECTION SYSTEM, CONTROL DEVICE, AND CONTROL METHOD

(71) Applicant: NEC Corporation, Tokyo (JP)

(72) Inventors: Toshiaki Yamashita, Tokyo (JP); Hideo Adachi, Tokyo (JP); Michitaro Shozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 16/303,290

(22) PCT Filed: May 17, 2017

(86) PCT No.: PCT/JP2017/018508
§ 371 (c)(1),
(2) Date: Nov. 20, 2018

(87) PCT Pub. No.: WO2017/204050
PCT Pub. Date: Nov. 30, 2017

(65) Prior Publication Data
US 2019/0212304 A1 Jul. 11, 2019

(30) Foreign Application Priority Data
May 27, 2016 (JP) .............................. JP2016-106764

(51) Int. Cl.
*G01N 29/04* (2006.01)
*G01N 29/12* (2006.01)
(Continued)

(52) U.S. Cl.
CPC ............. *G01N 29/12* (2013.01); *B64C 39/02* (2013.01); *B64C 39/024* (2013.01); *G01N 29/04* (2013.01);
(Continued)

(58) Field of Classification Search
CPC ........ G01N 3/34; G01N 29/045; G01N 29/04; G01N 2203/0039; B64C 39/02; B64C 39/024; B64C 2201/12; B64C 2201/123
See application file for complete search history.

(56) References Cited

U.S. PATENT DOCUMENTS 4,799,375 A * 1/1989 Lally ....................... G01N 3/30
73/12.09
2008/0125896 A1 5/2008 Troy et al.
(Continued)

FOREIGN PATENT DOCUMENTS

| CA | 2832956 A1 | 10/2012 |
| CN | 101933040 A | 12/2010 |

(Continued)

OTHER PUBLICATIONS

English Translation of JP 2015-194069 (Year: 2015).*
(Continued)

*Primary Examiner* — Alexander A Mercado
(74) *Attorney, Agent, or Firm* — Sughrue Mion, PLLC

(57) ABSTRACT

An inspection operator can perform a hammering inspection without operation to move an inspection device to a location to be inspected, and the hammering inspection can also be performed to the location to be inspected where a vehicle has difficulty in entering. An inspection system includes a flying device including a hammering inspection unit that performs an inspection and a flying unit that flies with the hammering inspection unit, a ground-side device that is fixedly installed at a position relative to a location to be inspected and detects a position of the flying device, and a flight instruction unit that controls the flying device in such a way that a forwarding direction of the flying device is a direction from the ground-side device to the location to be inspected based on the position of the flying device.

4 Claims, 11 Drawing Sheets

(51) Int. Cl.
*B64C 39/02* (2006.01)
*G05D 1/00* (2006.01)
*G05D 1/02* (2020.01)
*G05D 1/10* (2006.01)

(52) U.S. Cl.
CPC ......... *G01N 29/045* (2013.01); *G05D 1/0033* (2013.01); *G05D 1/0236* (2013.01); *B64C 2201/12* (2013.01); *B64C 2201/123* (2013.01); *G05D 1/0011* (2013.01); *G05D 1/101* (2013.01)

(56) References Cited

U.S. PATENT DOCUMENTS

| | | |
|---|---|---|
| 2009/0265193 A1 | 10/2009 | Collins et al. |
| 2010/0103311 A1 | 4/2010 | Makii |
| 2012/0262708 A1 | 10/2012 | Connolly |
| 2013/0024067 A1 | 1/2013 | Troy et al. |
| 2014/0165728 A1 | 6/2014 | Chaume et al. |
| 2014/0371952 A1* | 12/2014 | Ohtomo ................ G05D 1/106 701/2 |

FOREIGN PATENT DOCUMENTS

| | | | |
|---|---|---|---|
| CN | 103868994 A | 6/2014 | |
| EP | 2818958 A2 | 12/2014 | |
| FR | 2807603 A1 | 10/2001 | |
| JP | 2004-205216 A | 7/2004 | |
| JP | 2004-301665 A | 10/2004 | |
| JP | 3595492 B2 | 12/2004 | |
| JP | 2005-91298 A | 4/2005 | |
| JP | 2012-145346 A | 8/2012 | |
| JP | 2015-169435 A | 9/2015 | |
| JP | 2015-194069 A | 11/2015 | |
| JP | 5882951 B2 | 3/2016 | |

OTHER PUBLICATIONS

Toshihiro Nishizawa, "Research and Development of Flying Hammering Inspection Robot System for Inspection of Bridges and Tunnels", Research and Development Small Item (4)—(B) Development of Maintenance Management Robot and Disaster Coping Robot, Nov. 5, 2014, pp. 1-10 (total 10 pages).
Koki Hosoyama et al., "Development of Autonomous Flight of UAV", Japan Society of Photogrammetry and Remote Sensing 2016 Annual Conference Paper, May 26, 2016, pp. 51-52 (total 2 pages).
International Search Report dated Jun. 20, 2017, issued by the International Searching Authority in application No. PCT/JP2017/018508.
Written Opinion dated Jun. 20, 2017, issued by the International Searching Authority in application No. PCT/JP2017/018508 [PCT/ISA/237].
Extended European Search Report for EP Application No. EP17802642.3 dated Feb. 12, 2019.
Taiwanese Office Action for TW Application No. 10820584680 dated Jun. 24, 2019 with English Translation.
Korean Office Action for KR Application No. 10-2018-7034357 dated Jan. 29. 2020 with English Translation.
Chinese Office Action for CN Application No. 201780031275.3 dated Sep. 28, 2020 with English Translation.

* cited by examiner

INSPECTION SYSTEM, CONTROL DEVICE, AND CONTROL METHOD

This application is a National Stage Entry of PCT/JP2017/018508 filed on May 17, 2017, which claims priority from Japanese Patent Application 2016-106764 filed on May 27, 2016, the contents of all of which are incorporated herein by reference, in their entirety.

TECHNICAL FIELD

The present invention relates to an inspection system, a control device, a control method and a recording medium.

BACKGROUND ART

One of methods for inspecting damage, defects and the like of an object to be inspected is a hammering inspection performed by hitting the object to be inspected with an impact hammer or the like. Several techniques related to the hammering inspection are proposed.

For example, an outer wall lifting detection system described in PTL 1 includes a detection device, a monitoring/operating device for remotely operating the detection device. The detection device is mounted on a moving flight vehicle, and includes an impact hammer, a moving flight vehicle operation receiver, a sound collection device and a hitting sound transmitter. The monitoring/operating device includes a moving flight vehicle operation transmitter, a hitting sound receiver and a speaker. An operator remotely operates the moving flight vehicle, and an outer wall of the building is hit by the impact hammer.

In a structure hammering inspection device described in PTL 2, an inspection head for inspecting a surface of an object to be inspected by hitting is moved while pressed onto a surface of a structure using a head moving means. The structure hammering inspection device performs a hammering inspection to a predetermined area to be inspected by a series of consecutive motions while moving an automatic moving vehicle on which the head moving means is mounted.

In a hammering inspection device for tunnel lining concrete described in PTL 3, a post is mounted on a moving body that moves in a direction of an axis of the tunnel, and an arm is mounted at an upper end of the post. A supporting plate is mounted at the end of the arm, two lines of wheel for keeping a space are arranged on the supporting plate, and a hammer is also installed on the supporting plate. The two lines of wheels for keeping the space follow a rough surface of the tunnel lining concrete and keep touching the surface, thereby keeping a fixed space between the surface of the tunnel lining concrete and a start position of the hammer for hitting.

A wall inspection robot system described in PTL 4 includes a robot main body and an arm mechanism mounted on the robot main body. The robot main body includes a moving mechanism for moving to a desired position on a floor of a structure having a wall. The arm mechanism includes an inspection mechanism unit and moves the inspection mechanism unit along the wall. The robot main body includes a direction changing mechanism mounted on a mobile carriage.

CITATION LIST

Patent Literature

[PTL 1] Japanese Patent Application Laid-Open Publication No. 2012-145346
[PTL 2] Japanese Patent No. 3595492
[PTL 3] Japanese Patent Application Laid-Open Publication No. 2004-205216
[PTL 4] Japanese Patent Application Laid-Open Publication No. 2004-301665

SUMMARY OF INVENTION

Technical Problem

With the outer wall lifting detection system described in PTL 1, the operator is required to remotely control the moving flight vehicle, and navigate it to an appropriate inspection point. Therefore, the operator is required to be skillful at operating the moving flight vehicle. In the case the operator is inexperienced in the operation, the inspection requires more time than expected, or the inspection is not performed skillfully.

In the structure hammering inspection device described in PTL 2, the inspection head and the head moving means are mounted on the automatic moving vehicle, and the automatic moving vehicle moves. As a result, the hammering inspection using the structure hammering inspection device described in PTL 2 cannot be performed for an inspection point that is in an area where the automatic moving vehicle cannot enter.

With the hammering inspection device for tunnel lining concrete described in PTL 3, the hammering inspection device for tunnel lining concrete is mounted on the moving body such as a 2-ton truck and the hammering inspection device for tunnel lining concrete is moved by moving the moving body. The hammering inspection using the hammering inspection device for the tunnel lining concrete described in PTL 3 cannot be performed to an inspection point that is in an area where the moving body cannot enter.

Moreover, in the wall inspection robot system described in PTL 4, the wall inspection robot system is moved by moving the mobile carriage configuring the robot main body. The hammering inspection using the wall inspection robot system described in PTL 4 cannot be performed to an inspection point that is in an area where the mobile carriage cannot enter.

An example objective of the present invention is to provide an inspection system, a control device, a control method and a recording medium that can solve the above-mentioned problems.

Solution to Problem

According to a first exemplary aspect of the present invention, an inspection system includes: a flying device including a hammering inspection means for performing an inspection by hitting a location to be inspected from a predetermined position relative to the location to be inspected, and a flying means for flying with the hammering inspection means mounted on the flying means; a ground-side device that is fixedly installed at a position relative to the location to be inspected and detects a position of the flying device; and a flight instruction means for controlling, based on the position of the flying device detected by the ground-side device, the flying device in such a way that a forwarding direction of the flying device is a direction from the ground-side device to the location to be inspected.

According to a second exemplary aspect of the present invention, a control device includes: a flight instruction means for controlling, based on a position of a flying device detected by a ground-side device, the flying device in such a way that a forwarding direction of the flying device is a direction from the ground-side device to a location to be inspected, the flying device including a hammering inspection means for performing an inspection by hitting the location to be inspected from a predetermined position relative to the location to be inspected and a flying means for flying with the hammering inspection means mounted on the flying means, the ground-side device being fixedly installed at a position relative to the location to be inspected and detecting the position of the flying device.

According to a third exemplary aspect of the present invention, a control method includes: controlling, based on a position of a flying device detected by a ground-side device, the flying device in such a way that a forwarding direction of the flying device is a direction from the ground-side device to a location to be inspected, the flying device including a hammering inspection means for performing an inspection by hitting the location to be inspected from a predetermined position relative to the location to be inspected and a flying means for flying with the hammering inspection means mounted on the flying means, the ground-side device being fixedly installed at a position relative to the location to be inspected and detecting the position of the flying device.

According to a fourth exemplary aspect of the present invention, a computer readable storage medium records thereon a program causing a computer to perform a method including: controlling, based on a position of a flying device detected by a ground-side device, the flying device in such a way that a forwarding direction of the flying device is a direction from the ground-side device to a location to be inspected, the flying device including a hammering inspection means for performing an inspection by hitting the location to be inspected from a predetermined position relative to the location to be inspected and a flying means for flying with the hammering inspection means mounted on the flying means, the ground-side device being fixedly installed at a position relative to the location to be inspected and detecting the position of the flying device.

Advantageous Effects of Invention

An advantageous effect of the present invention is that an inspection operator can perform a hammering inspection without operation to move an inspection device to a location to be inspected, and the hammering inspection can also be performed to a location to be inspected where a vehicle has difficulty in entering.

EXAMPLE EMBODIMENT

Hereinafter, the example embodiment of the present invention will be described. However, the following example embodiment is not intended to limit the claimed invention. Moreover, not all of combinations of features described in the example embodiment are required for the solution to the problem.

Figure 1:
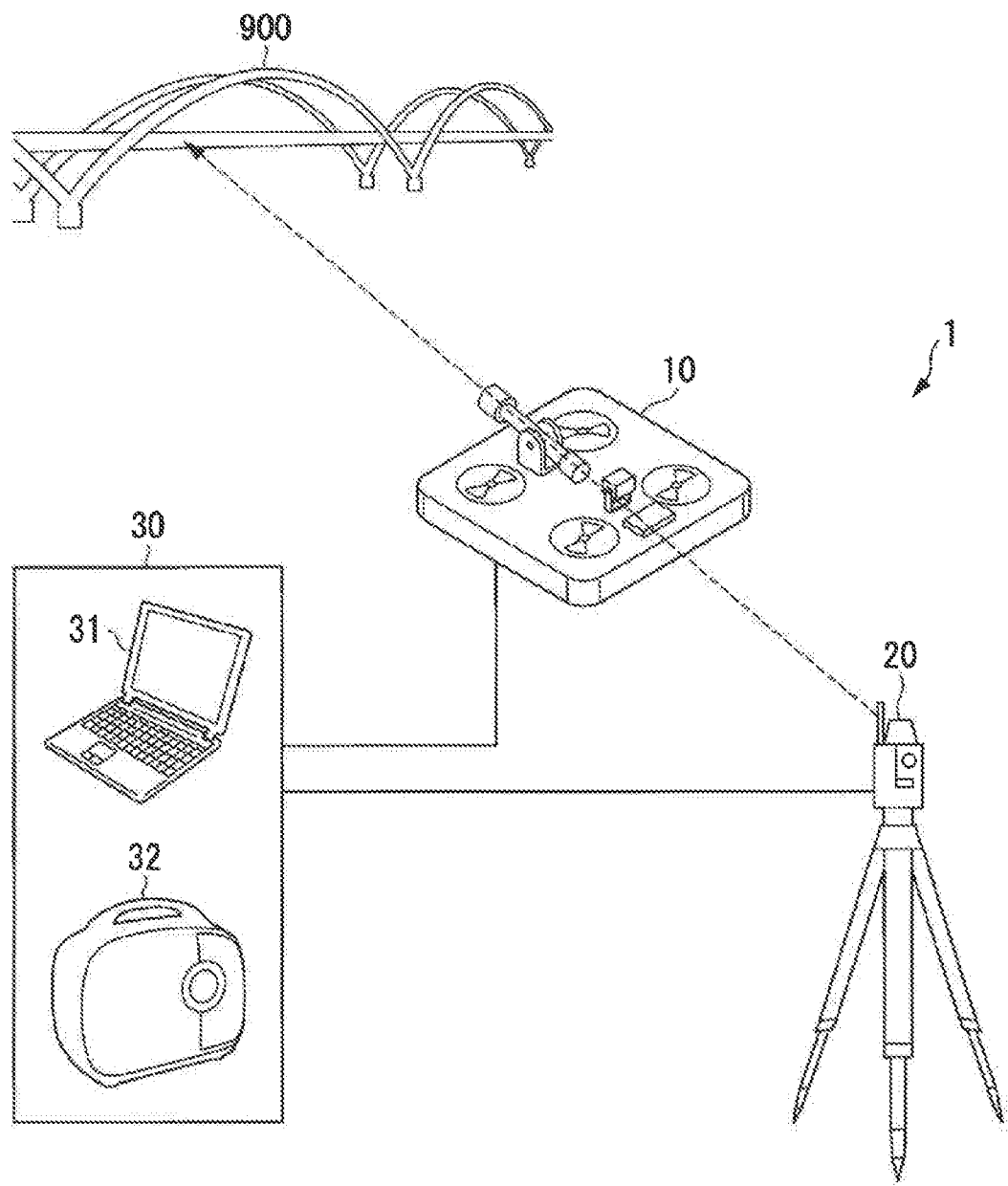
FIG. 1 is a schematic configuration diagram illustrating a device configuration of an inspection system according to an example embodiment of the present invention.

FIG. 1 is a schematic configuration diagram illustrating a device configuration of an inspection system according to an example embodiment of the present invention. As illustrated in FIG. 1, the inspection system 1 includes a flying device 10, a ground-side device 20, and a control system 30. The control system 30 includes a control device 31 and a power supply device 32. In addition, a location to be inspected 900 is illustrated in FIG. 1.

As used herein, "Control" refers to giving instructions regarding flight.

The inspection system 1 performs a hammering inspection to a location to be inspected of a structure body such as a tunnel or a bridge. As used herein, the hammering inspection is an inspection method in which sound is collected by hitting the location to be inspected. Based on the frequency and the like of the collected sound, the presence or absence of an abnormality can be determined. Generally, the location to be inspected is not a single point but an area with a range of some extent.

The flying device 10 flies to and around the location to be inspected 900 and performs a hammering inspection.

The ground-side device 20 is fixedly installed at a position relative to the location to be inspected 900. The ground-side device 20 detects a position of the flying device 10 and notifies the control device 31 of the detected position. A total station can be used as the ground-side device 20, for example.

The control device 31 controls the flight of the flying device 10 by transmitting flight instruction to the flying device 10. When controlling the flight of the flying device 10, the control device 31 sets a coordinate using an installation position of the ground-side device 20 as a reference. Specifically, the control device 31 sets a coordinate having the installation position of the ground-side device 20 as an origin, and a direction from the ground-side device 20 to the location to be inspected 900 as an x-direction. The flying device 10 can reach the location to be inspected 900 by following the x-axis of the coordinate. The control device 31 is configured by a computer, for example.

The power supply device 32 supplies power to each unit of the inspection system 1. Specifically, the control system 30 and the flying device 10 are connected by wired connection including a power line and a signal line, and the power supply device 32 supplies the power to the flying device 10 via the power line. However, the connection method between the control system 30 and the flying device 10 is not limited to the wired connection. For example, the flying device 10 may include a power source such as a battery and may self-supply the power, and may connect to the control device 31 by wireless connection.

Similarly, the ground-side device 20 and the control system 30 may be connected by wired connection or wireless connection.

Figure 2:
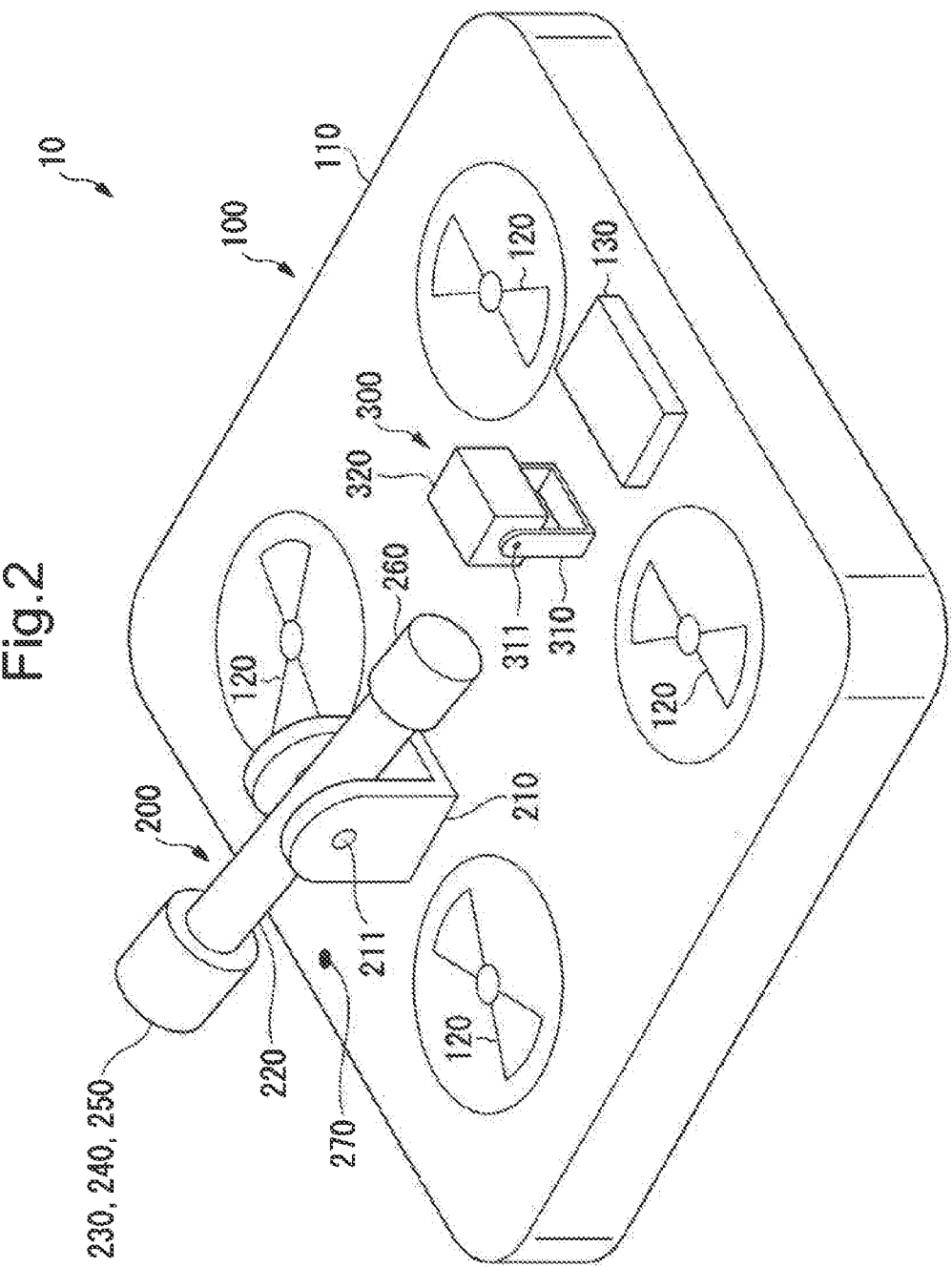
FIG. 2 is a perspective view illustrating a schematic external shape of a flying device according to the example embodiment.

FIG. 2 is a perspective view illustrating a schematic external shape of the flying device 10. As illustrated in FIG. 2, the flying device 10 includes a flying unit 100, a hammering inspection unit 200 and a laser range finder 300. The flying unit 100 includes a flying device main body 110, a fan 120, and a balancer for main body 130.

The hammering inspection unit 200 includes a pedestal for inspection unit 210, an arm 220, an impact unit 230, a balancer for inspection unit 260, and a microphone 270. The pedestal for inspection unit 210 includes a rotation shaft for inspection unit 211. The impact unit 230 incorporates a distance measuring unit 240 and a force sensor 250. The laser range finder 300 includes a pedestal for finder 310 and a finder main body 320. The pedestal for finder 310 includes a rotation shaft for finder 311.

The flying unit 100 flies with the impact unit 230 mounted on the flying unit 100. An unmanned helicopter (a so-called drone) that is remote-controlled or that autonomously flies can be used as the flying unit 100.

The fan 120 rotates to cause an airflow, thereby operating the flying device 10. An attitude of the flying device 10 is controlled by using balance among the number of rotations of the four fans 120. The flying device 10 flies with a side in which the hammering inspection unit 200 is arranged facing front. As a result, a hammering inspection can be performed with the hammering inspection unit 200 approached to the location to be inspected 900.

The balancer for main body 130 is a weight for maintaining gravity balance of the flying device 10, between the hammering inspection unit 200 and the balancer for main body 130.

The hammering inspection unit 200 performs the hammering inspection by hitting the location to be inspected 900 from a predetermined position relative to the location to be inspected 900. The predetermined position relative to the location to be inspected 900 is a position in front of the location to be inspected 900 and at a predetermined distance from the location to be inspected 900. The position of the hammering inspection unit 200 relative to the location to be inspected 900 is determined in order to hit the location to be inspected 900 at a constant strength and from a constant angle.

The pedestal for inspection unit 210 rotatably supports the arm 220 on an axis of the rotation shaft for inspection unit 211. Moreover, the pedestal for inspection unit 210 may also rotatably support the arm 220 in a horizontal direction (a direction parallel to an upper surface of the flying device main body 110).

The arm 220 moves the impact unit 230 by rotating on the axis of the rotation shaft for inspection unit 211. Specifically, the rotation of the arm 220 on the axis of the rotation shaft for inspection unit 211, when the flying device 10 is located in front of the location to be inspected 900 and close to the location to be inspected 900, causes the impact unit 230 to hit the location to be inspected 900.

The impact unit 230 is moved by the rotation of the arm 220 as described above. The hammering inspection unit 200 performs the hammering inspection of the location to be inspected 900 by hitting of the location to be inspected 900 with the movement of the impact unit 230.

The distance measuring unit 240 measures, in the case there is an object in a moving direction of the flying device 10, a distance from the impact unit 230 to the object. Specifically, with the flying device 10 located in front of the location to be inspected 900, the distance measuring unit 240 measures the distance from the impact unit 230 to the location to be inspected 900.

The measurement of the distance from the impact unit 230 to the location to be inspected 900 by the distance measuring unit 240 allows determination whether a position of the impact unit 230 relative to the location to be inspected 900 is appropriate or not for performing the hammering inspection.

A laser distance sensor may be used as the distance measuring unit 240. However, not limited to this, another means may be used as the distance measuring unit 240 as long as the distance from the impact unit 230 to the object can be measured. For example, an ultrasonic distance sensor may be used as the distance measuring unit 240.

The force sensor 250 detects force applied to the impact unit 230. The impact unit 230 is moved to a position for hitting the location to be inspected 900 before actually hitting the location to be inspected 900 in the hammering inspection, and the force sensor 250 determines whether a contact with an object is detected. As a result, whether the position of the impact unit 230 relative to the location to be inspected 900 is appropriate or not for performing the hammering inspection is determined.

The balancer for inspection unit 260 is a weight for maintaining gravity balance of the hammering inspection unit 200, between the impact unit 230 and the balancer for inspection unit 260.

The microphone 270 collects ambient sound. Specifically, the microphone 270 collects hitting sound when the impact unit 230 hits the location to be inspected 900.

The finder main body 320 detects an object located in front (moving direction) of the flying device 10, and measures a distance from the finder main body 320 to the object. The finder main body 320 is used in order to detect the position of the location to be inspected 900 and in order to confirm presence/absence of an obstacle when the flying device 10 flies to the location to be inspected 900.

The pedestal for finder 310 rotatably supports the finder main body 320 on an axis of the rotation shaft for finder 311. Moreover, the pedestal for finder 310 may also rotatably support the finder main body 320 in the horizontal direction (the direction parallel to the upper surface of the flying device main body 110). Alternatively, the pedestal for finder 310 may support the finder main body 320 in such a way that a direction of the finder main body 320 is fixed.

Figure 3:
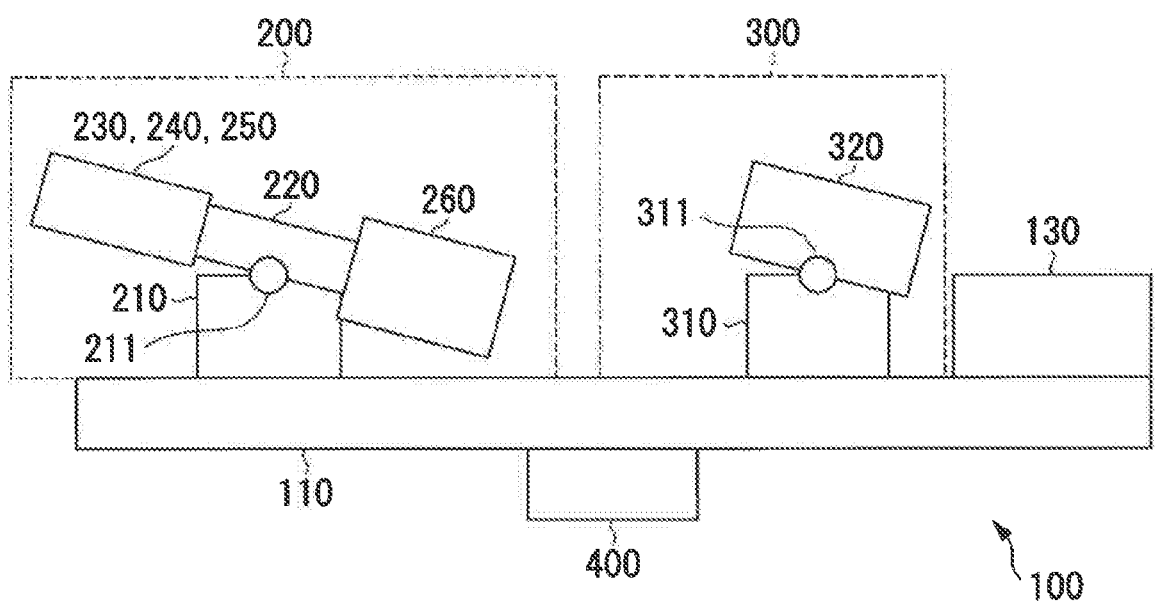
FIG. 3 is a side view illustrating the schematic external shape of the flying device according to the example embodiment.

FIG. 3 is a side view illustrating the schematic external shape of the flying device 10. As illustrated in FIG. 3, the flying device 10 includes a corner cube 400, in addition to the units described with reference to FIG. 2.

The corner cube 400 reflects incident light into the corner cube 400 to the incident direction. Specifically, the corner cube 400 reflects, to the ground-side device 20, a laser beam which is emitted to the flying device 10 from the ground-side device 20. The ground-side device 20 receives the laser beam, and detects the position of the flying device 10 relative to the ground-side device 20. The corner cube 400 is configured by including a right-angle prism or reflective plates that are combined at a right angle.

Figure 4:
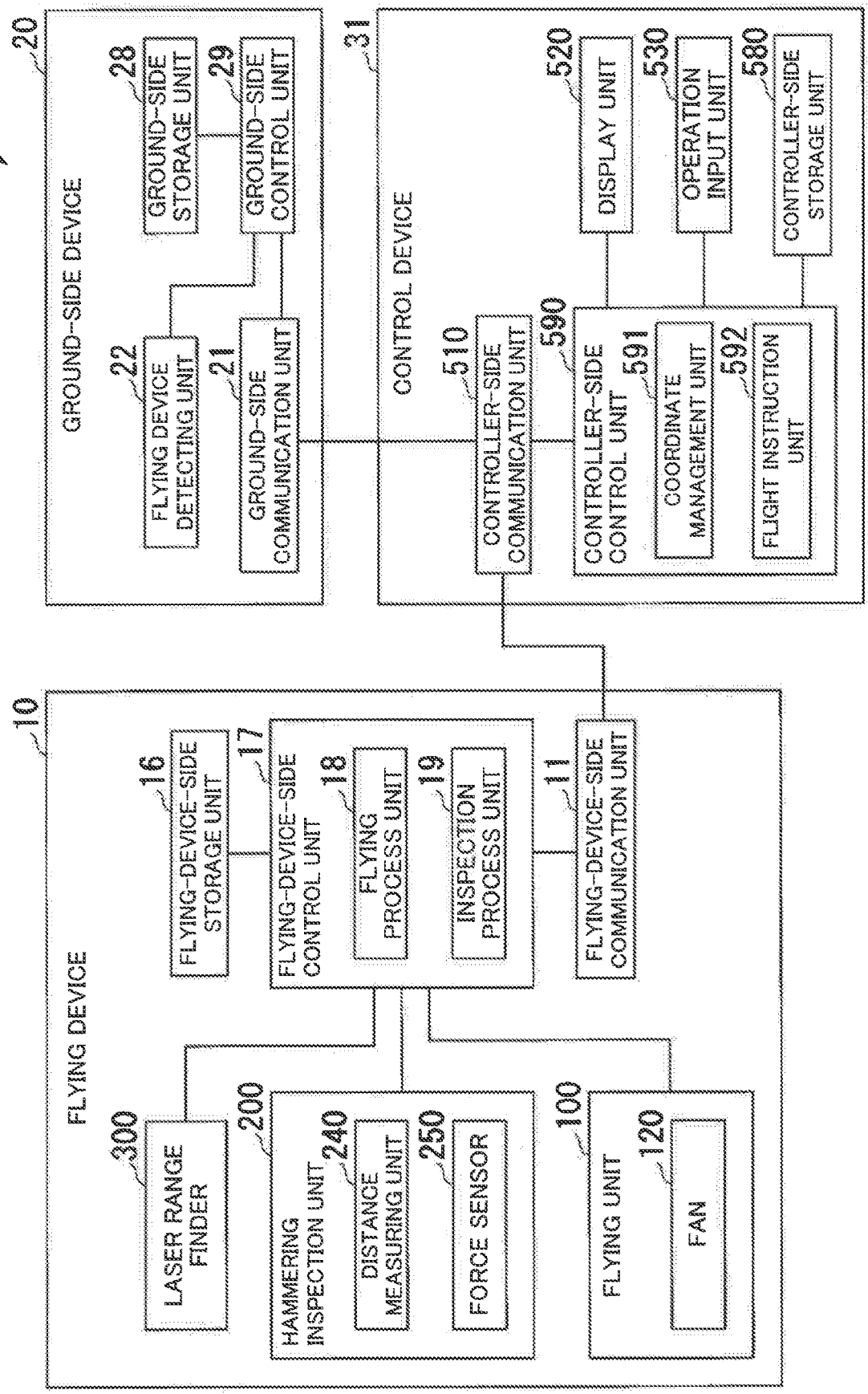
FIG. 4 is a schematic block diagram illustrating a configuration of functions of the inspection system according to the example embodiment.

FIG. 4 is a schematic block diagram illustrating a configuration of functions of the inspection system 1. The flying device 10, the ground-side device 20, and the control device 31 are illustrated in FIG. 4, out of the units of the inspection system 1 described with reference to FIG. 1. The flying unit 100, the fan 120, the hammering inspection unit 200, the distance measuring unit 240, the force sensor 250, and the laser range finder 300 are illustrated in FIG. 4, out of the units of the flying device 10 described with reference to FIG. 2.

Additionally, as illustrated in FIG. 4, the flying device 10 further includes a flying-device-side communication unit 11, flying-device-side storage unit 16, and a flying-device-side control unit 17. The flying-device-side control unit 17 includes a flying process unit 18 and an inspection process unit 19. In addition, the ground-side device 20 includes a ground-side communication unit 21, a flying device detecting unit 22, a ground-side storage unit 28 and a ground-side control unit 29. The control device 31 includes a controller-side communication unit 510, a display unit 520, an operation input unit 530, a controller-side storage unit 580, and a controller-side control unit 590. The controller-side control unit 590 includes a coordinate management unit 591 and a flight instruction unit 592.

The flying-device-side communication unit 11 communicates with other devices. Specifically, the flying-device-side communication unit 11 receives flight instruction from the control device 31.

The flying-device-side storage unit 16 stores various data. The flying-device-side storage unit 16 is configured by a storage device included in the flying device 10.

The flying-device-side control unit 17 controls respective units of the flying device 10 and executes various processes. The flying-device-side control unit 17 is configured by, for example, a CPU (Central Processing Unit) included in the flying device 10 reading a program from the flying-device-side storage unit 16 and executing the program.

The flying process unit 18 controls flight of the flying device 10 by controlling the rotation of the fan 120. In the case the flying-device-side communication unit 11 receives a flight instruction from the control device 31, the flying process unit 18 controls the flight of the flying device 10 according to the flight instruction.

The inspection process unit 19 performs the hammering inspection by controlling the hammering inspection unit 200. Specifically, the inspection process unit 19 controls the hammering inspection unit 200 to make the arm 220 rotate around the axis of the rotation shaft for inspection unit 211, and to make the impact unit 230 hit the location to be inspected 900.

The inspection process unit 19 corresponds to an example of an impact-unit-position confirmation unit, and confirms a position relative to the location to be inspected 900 of the impact unit 230 before the impact unit 230 hits the location to be inspected 900.

Specifically, the inspection process unit 19 moves the impact unit 230 to the position for hitting the location to be inspected 900, and determines presence/absence of the contact between the impact unit 230 and the location to be inspected 900 based on sensing data from the force sensor 250.

Alternatively, the inspection process unit 19 refers to a distance to the location to be inspected 900 measured by the distance measuring unit 240, and determines whether the distance between the distance measuring unit 240 and the location to be inspected 900 is the predetermined distance or not.

The inspection process unit 19 may perform one of the above determinations using the force sensor 250 and the above determination using the distance measuring unit 240, or may perform both. However, the process for confirming the position of the impact unit 230 relative to the location to be inspected 900 by the inspection process unit 19 is not mandatory. The inspection process unit 19 may not perform the process.

The ground-side communication unit 21 communicates with other devices. Specifically, the ground-side communication unit 21 transmits position information indicating a position of the flying device 10 detected by the flying device detecting unit 22 to the control device 31.

The flying device detecting unit 22 detects the position of the flying device 10 relative to the ground-side device 20. Specifically, the flying device detecting unit 22 emits a laser beam. Then, after receiving the laser beam reflected by the corner cube 400 of the flying device 10, the flying device detecting unit 22 detects a direction of the flying device 10 from the ground-side device 20 and a distance between the ground-side device 20 and the flying device 10, based on a direction in which the laser beam is emitted and a delay time or a phase difference from the emission to the reception of the laser beam.

The ground-side storage unit 28 stores various data. The ground-side storage unit 28 is configured by a storage device included in the ground-side device 20.

The ground-side control unit 29 controls respective units of the ground-side device 20 and executes various processes. Specifically, the ground-side control unit 29 controls the ground-side communication unit 21 to make the ground-side communication unit 21 communicate with the control device 31. In addition, the ground-side control unit 29 controls the flying device detecting unit 22 to make the flying device detecting unit 22 detect the position of the flying device 10. The ground-side control unit 29 is configured by, for example, a CPU included in the ground-side device 20 reading a program from the ground-side storage unit 28 and executing the program.

The controller-side communication unit 510 communicates with other devices. Specifically, the controller-side communication unit 510 transmits a flight instruction to the flying device 10 according to the control by the controller-side control unit 590. Moreover, the controller-side communication unit 510 transmits, to the flying device 10, a flight instruction instructing a forwarding direction of the flying device 10. In addition, the flying-device-side communication unit 11 receives the position information indicating the position of the flying device 10 detected by the ground-side device 20 from the ground-side device 20.

The display unit 520 includes a display screen such as a liquid crystal panel or an LED (Light Emitting Diode) panel, and displays various images. Specifically, the display unit 520 displays a result of the hammering inspection. In addition, the display unit 520 may display the position of the location to be inspected 900 and the position of the flying device 10 according to the control by the controller-side control unit 590.

The operation input unit 530 includes input devices such as a keyboard and a mouse, and accepts user operation. Specifically, the operation input unit 530 accepts user operation for specifying two points on a surface of the location to be inspected 900. For example, a coordinate is set on a design drawing of the location to be inspected 900, and the operation input unit 530 accepts the user operation inputting coordinates of the two points. The two points specified here are used for setting a coordinate for managing the position of the flying device 10.

The controller-side storage unit 580 stores various data. The controller-side storage unit 580 is configured by a storage device included in the control device 31.

The controller-side control unit 590 controls various units of the control device 31 and executes various process. The controller-side control unit 590 is configured by, for example, a CPU included in the control device 31 reading a program from the controller-side storage unit 580 and executing the program.

The coordinate management unit 591 sets the coordinate having the position of the ground-side device 20 as the origin, based on the two points on the surface of the location to be inspected 900 specified by the user operation at the operation input unit 530. Then, the coordinate management unit 591 manages the position of the flying device 10 using the coordinate.

The flight instruction unit 592 generates a flight instruction for the flying device 10, and transmits the flight instruction to the flying device 10 via the controller-side communication unit 510. Accordingly, the flight instruction unit 592 controls the flight of the flying device 10. Specifically, the flight instruction unit 592 controls the flying device 10 in such a way that the forwarding direction of the flying device 10 is a direction from the ground-side device 20 to the location to be inspected 900, based on the position of the flying device 10 detected by the ground-side device 20. Moreover, the flight instruction unit 592 accepts the user operation for specifying two points on the surface of the location to be inspected 900. Then, the flight instruction unit 592 controls the flying device 10 in such a way that the forwarding direction of the flying device 10 is a direction being orthogonal to a straight line including the two points and being from the ground-side device 20 to the location to be inspected 900.

Then, the instruction of the forwarding direction of the flying device 10 performed by the flight instruction unit 592 is described with reference to FIG. 5 to FIG. 7.

Figure 5:
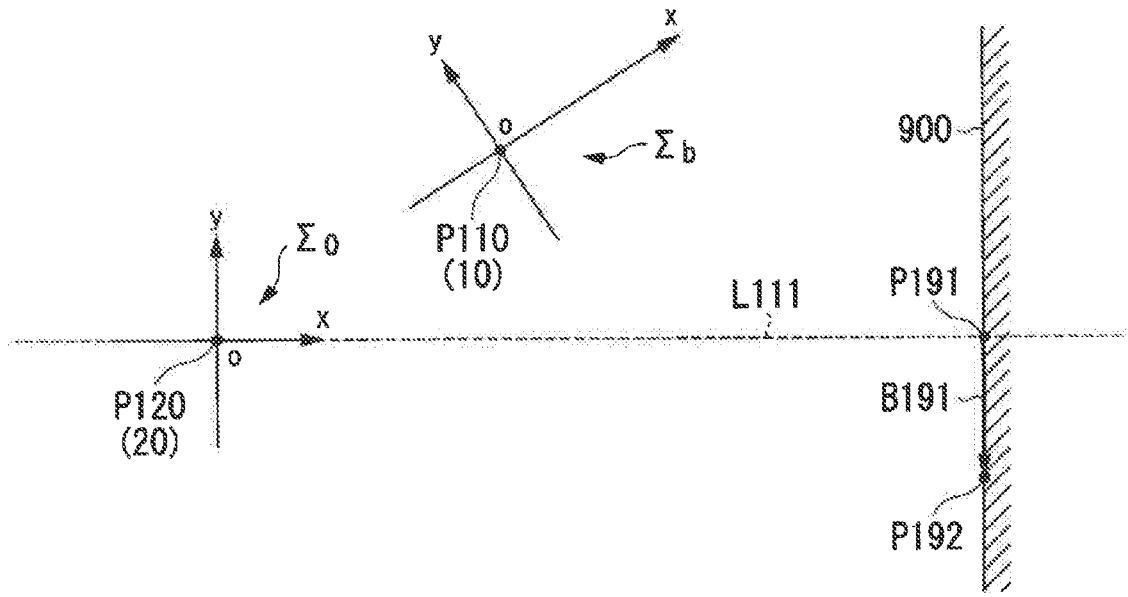
FIG. 5 is an explanatory diagram illustrating an example of a coordinate used in the inspection system according to the example embodiment.

FIG. 5 is an explanatory diagram illustrating an example of a coordinate used in the inspection system 1. FIG. 5 illustrates an example in which the ground-side device 20, flying device 10 and the location to be inspected 900 are viewed from the above (upper sky).

In the example of FIG. 5, the flying device 10 is at a point P110. The ground-side device 20 is arranged at a point P120. A point P191 and a point P192 are two points specified by the user.

The coordinate management unit 591 calculates a vector connecting the two points specified by the user operation. In the example in FIG. 5, the coordinate management unit 591 calculates a vector B 191. Then, the coordinate management unit 591 calculates a straight line that is orthogonal to the calculated vector, and included in the horizontal plane. In the example in FIG. 5, the coordinate management unit 591 calculates a vector L111. Then, the coordinate management unit 591 sets a coordinate system $\Sigma_0$ having a position of the ground-side device 20 as an origin based on the obtained straight line.

Specifically, the coordinate management unit 591 sets an x-axis in such a way as to have the position of the ground-side device 20 as the origin and to be parallel to the obtained straight line. The coordinate management unit 591 sets a z-axis in an upward vertical direction. Then, the coordinate management unit 591 sets a y-axis that is orthogonal to the x-axis and the z-axis. In the example of FIG. 5, the coordinate management unit 591 sets coordinate axes of right-handed coordinate system, however, the coordinate management unit 591 may set coordinate axes of left-handed coordinate system.

On the other hand, a coordinate system $\Sigma_b$ is a coordinate system used by the flying device 10. In the coordinate system $\Sigma_b$, a position of the flying device 10 is set to an origin. In addition, an x-axis is set to a forwarding direction of the flying device 10. Note that the flying device 10 flies keeping substantially horizontal attitude. Therefore, the x-axis of the coordinate system $\Sigma_b$ is set along the horizontal plane.

A z-axis is set in an upward vertical direction. Then, a y-axis that is orthogonal to the x-axis and the z-axis is set. In the example of FIG. 5, the flying device 10 uses coordinate axes of right-handed coordinate system, however, the flying device 10 may use coordinate axes of left-handed coordinate system. The coordinate system $\Sigma_b$ moves as the flying device 10 moves.

Figure 6:
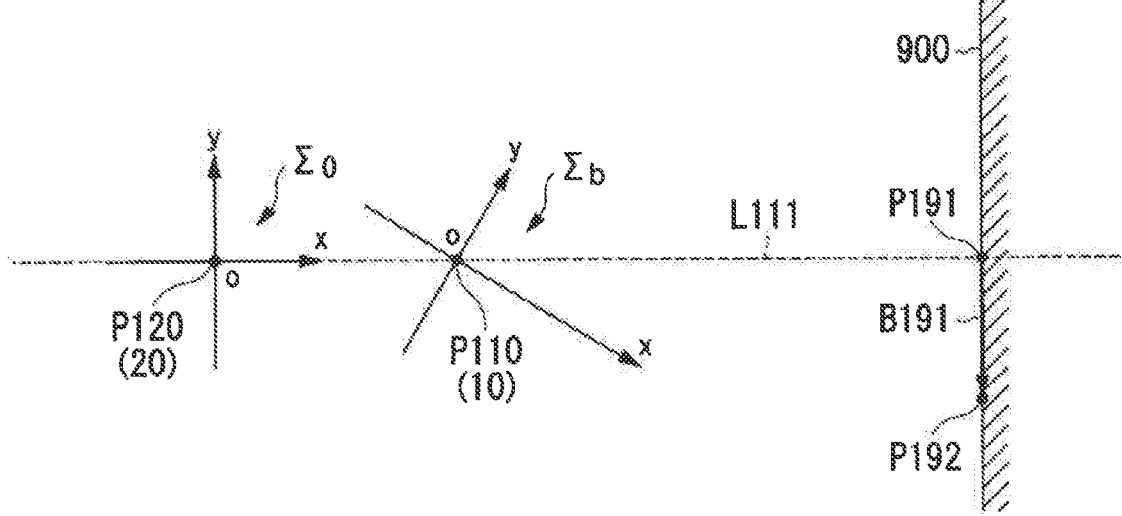
FIG. 6 is an explanatory diagram illustrating an example of the flying device according to the example embodiment located on an x-axis of a coordinate system $\Sigma_0$.

FIG. 6 is an explanatory diagram illustrating an example of the flying device 10 located on the x-axis of the coordinate system $\Sigma_0$. The coordinate management unit 591 calculates a difference of the position of the flying device 10 from the x-axis of the coordinate system $\Sigma_0$, based on the position of the flying device 10 detected by the ground-side device 20. Then, the flight instruction unit 592 generates a flight instruction to cause the flying device 10 to move to the x-axis of the coordinate system $\Sigma_0$ based on the difference calculated by the coordinate management unit 591, and transmits the instruction to the flying device 10 via the controller-side communication unit 510.

In the example of FIG. 6, the flying device 10 flies according to the flight instruction, and is positioned on the x-axis of the coordinate system $\Sigma_0$. In the diagram, the forwarding direction of the flying device 10 that is the x-axis of the coordinate system $\Sigma_b$ differs from the direction to the location to be inspected 900.

Figure 7:
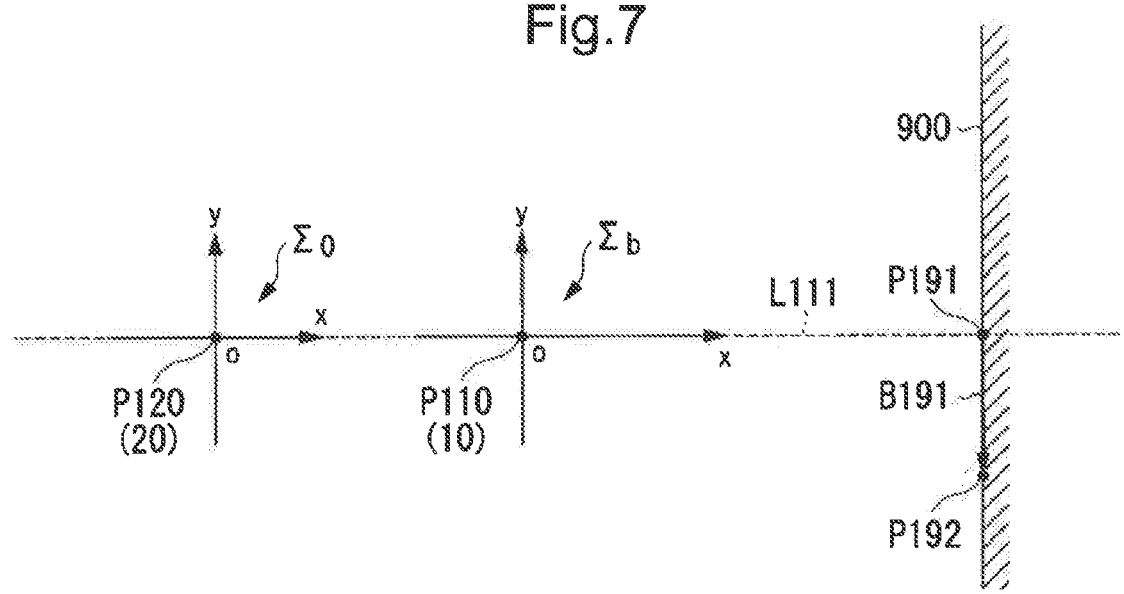
FIG. 7 is an explanatory diagram illustrating an example of the flying device according to the example embodiment located on the x-axis of the coordinate system $\Sigma_0$ and the forwarding direction of the flying device is aligned to the x-direction of the coordinate system $\Sigma_0$.

FIG. 7 is an explanatory diagram illustrating an example of the flying device 10 located on the x-axis of the coordinate system $\Sigma_0$ and the forwarding direction of the flying device 10 is aligned to the x-direction of the coordinate system $\Sigma_0$. In the flight instruction, the flight instruction unit 592 instructs the flying device 10 to move straight. Since the flying device 10 moves straight according to the flight instruction, and the ground-side device 20 detects the position of the flying device 10, the coordinate management unit 591 detects the forwarding direction of the flying device 10. As a result, the coordinate management unit 591 detects the coordinate system $\Sigma_b$.

Based on the difference between the forwarding direction of the flying device 10 and the x-direction of the coordinate system $\Sigma_0$ detected by the coordinate management unit 591, the flight instruction unit 592 generates a flight instruction to cause the flying device 10 to move in a direction to reduce the difference, and transmits the instruction to the flying device 10 via the controller-side communication unit 510. The flight of the flying device 10 according to the flight instruction reduces the difference between the forwarding direction of the flying device 10 and the x-direction of the coordinate system $\Sigma_0$, and the forwarding direction of the flying device 10 eventually matches the x-direction of the coordinate system $\Sigma_0$, as illustrated in the example of FIG. 7. When the flying device 10 moves straight from this state, the flying device reaches the location to be inspected 900. At the same time, the forwarding direction of the flying device 10 becomes orthogonal to the surface of the location to be inspected 900. As a result, the hammering inspection unit 200 is in an appropriate position to the location to be inspected 900, and a hammering inspection can be performed.

Next, an operation of the inspection system 1 is described with reference to FIG. 8 to FIG. 10.

Figure 8:
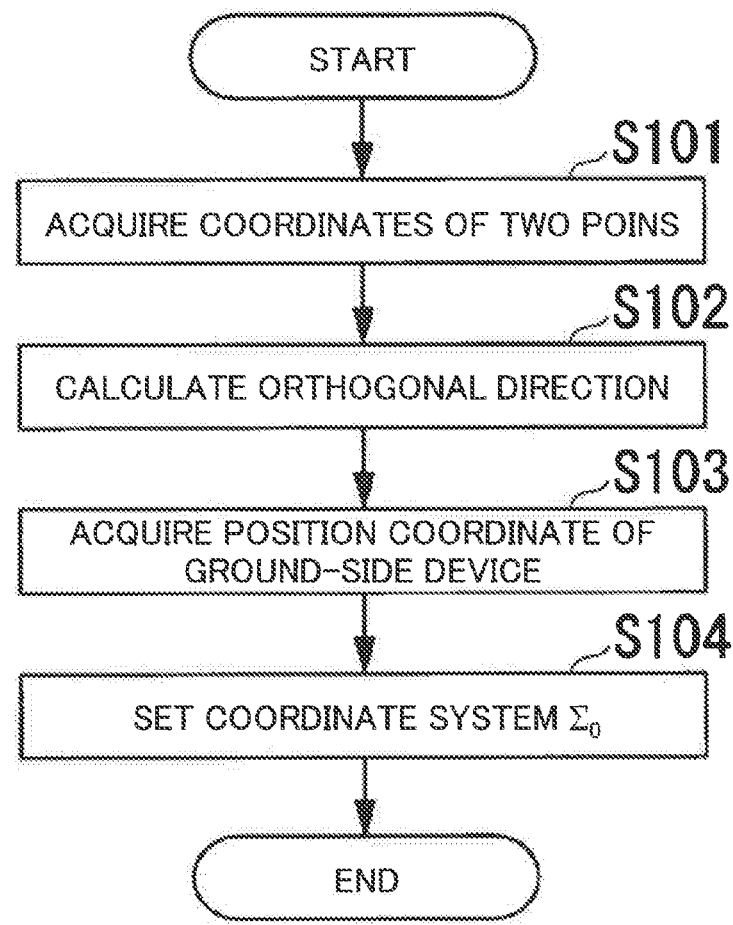
FIG. 8 is a flow chart illustrating an example of a procedure for a control device according to the example embodiment to set the coordinate system $\Sigma_0$.

FIG. 8 is a flow chart illustrating an example of a procedure for the control device 31 to set the coordinate system $\Sigma_0$. In the process in FIG. 8, the coordinate management unit 591 acquires coordinates of two points specified by the user (step S101).

Then, the coordinate management unit 591 calculates a direction that is orthogonal to a vector connecting the two points (step S102).

The coordinate management unit 591 acquires a position coordinate of the ground-side device 20 (step S103). For example, the ground-side device 20 measures a position of the ground-side device 20 itself, and notifies the coordinate management unit 591 of the measurement result in latitude and longitude.

The coordinate management unit 591 sets the coordinate system $\Sigma_0$, based on the direction acquired in step S102 and a relation between the position acquired in step S103 and the position of the location to be inspected 900 (step S104).

The process of FIG. 8 terminates after step S104.

Figure 9:
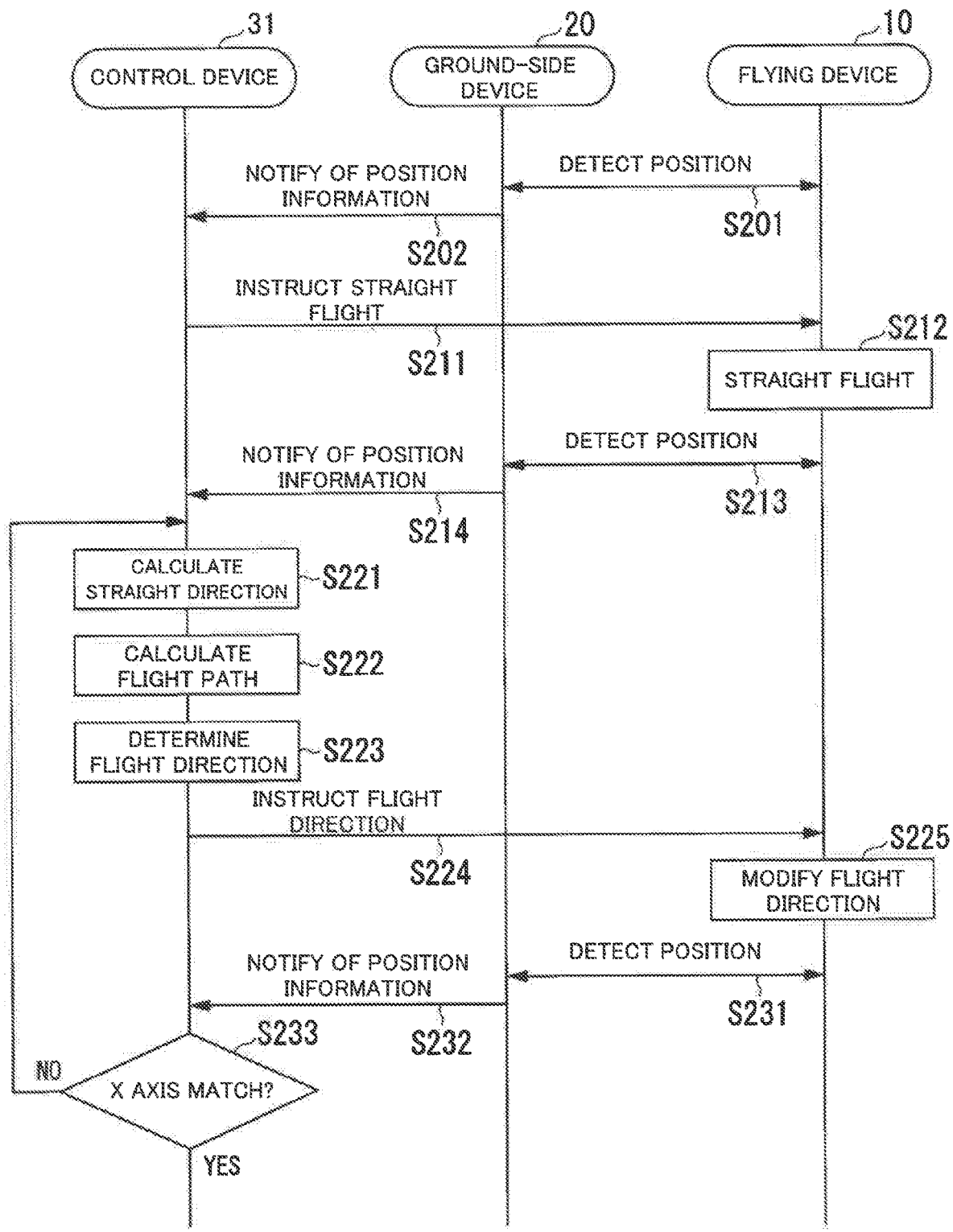
FIG. 9 is an explanatory diagram illustrating an example of a process for the control device according to the example embodiment to control a position and direction of the flying device.

FIG. 9 is an explanatory diagram illustrating an example of a process for the control device 31 to control a position and direction of the flying device 10.

In the process of FIG. 9, the ground-side device 20 detects a position of the flying device 10 (sequence S201). Then, the ground-side device 20 notifies the control device 31 of the detected position (sequence S202).

The control device 31 instructs the flying device 10 to fly straight (sequence S211). The flying device 10 flies straight according to the instruction (sequence S212). In other words, the flying device 10 flies in a forwarding direction.

Then, the ground-side device 20 detects the position of the flying device 10 (sequence S213). The ground-side device 20 notifies the control device 31 of the detected position (sequence S214).

The control device 31 calculates a straight direction (forwarding direction) of the flying device 10 based on the position acquired in sequence S202 and the position acquired in sequence S214 (sequence S221).

Then, the control device 31 calculates a flight path in order to match the forwarding direction of the flying device 10 to the x-direction of the coordinate system $\Sigma_0$ (sequence S222). The control device 31 determines a flight direction to be instructed to the flying device 10, based on the determined flight path (sequence S223). Then, the control device 31 instructs the determined flight direction to the flying device 10 (sequence S224). The flying device 10 flies according to the instruction (sequence S225).

Then, the ground-side device 20 detects the position of the flying device 10 (sequence S231). The ground-side device 20 notifies the control device 31 of the detected position (sequence S232).

The control device 31 calculates the forwarding direction of the flying device 10, and determines whether the direction matches the x-direction of the coordinate system $\Sigma_0$ (sequence S233).

When it is determined that the direction matches (sequence S233: YES), the process of the FIG. 9 terminates. On the other hand, when it is determined that the direction does not match (sequence S233: NO), the process returns to sequence S221.

Figure 10:
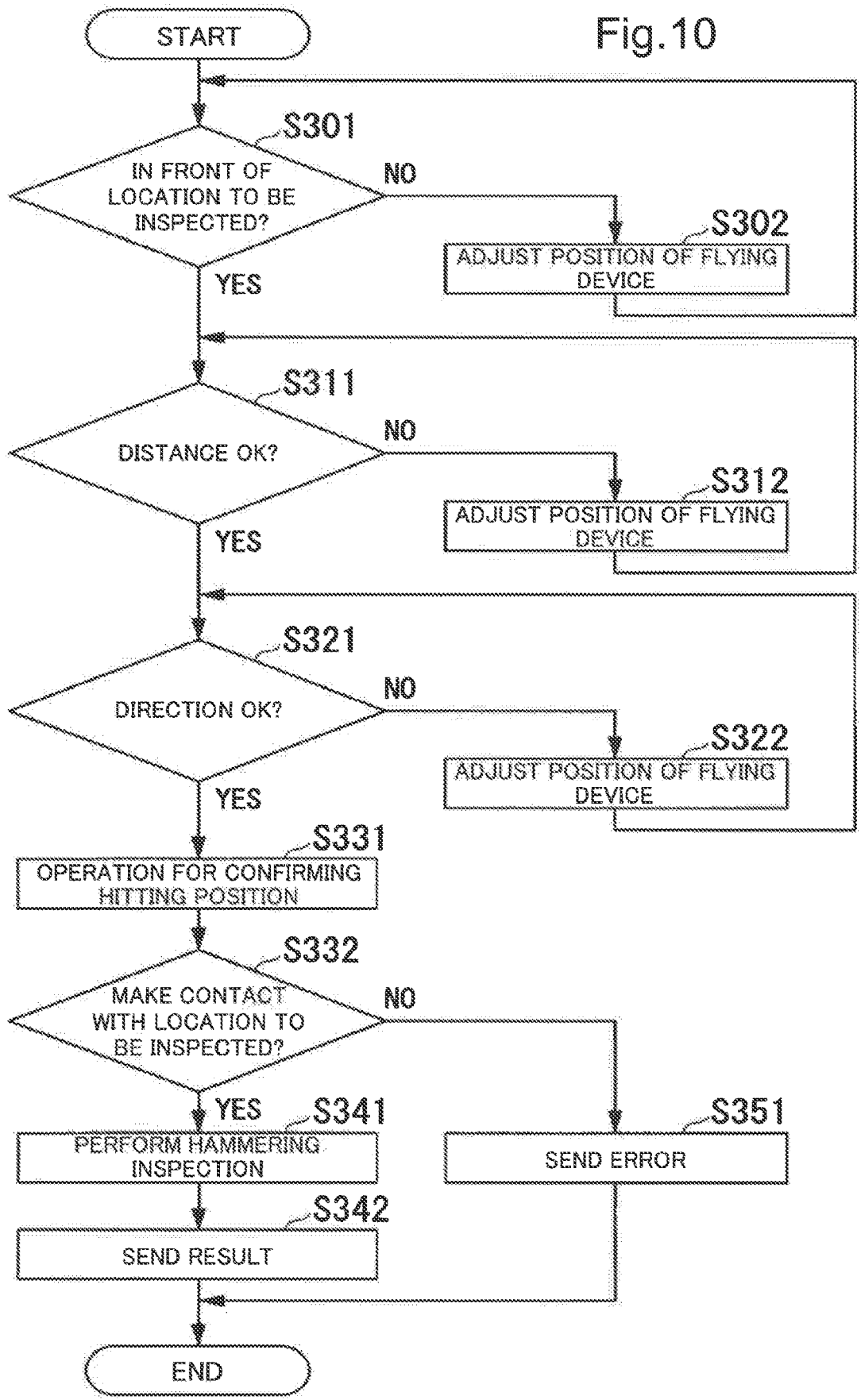
FIG. 10 is a flow chart illustrating an example of a procedure for the flying device according to the example embodiment to perform a hammering inspection.

FIG. 10 is a flow chart illustrating an example of a procedure for the flying device 10 to perform a hammering inspection.

In the processing in FIG. 10, the inspection process unit 19 determines whether the flying device 10 is located in front of the location to be inspected 900 or not (step S301).

When the flying device 10 is determined as not being located in front (step S301: NO), the flying process unit 18 adjusts the position of the flying device 10 (step S302). After step S302, the process returns to step S301.

On the other hand, when the flying device 10 is determined as being located in front (step S301: YES), the inspection process unit 19 determines whether a distance between the flying device 10 and the location to be inspected 900 is appropriate or not (step S311).

When the position is determined as not being appropriate (step S311: NO), the flying process unit 18 adjusts the position of the flying device 10 (step S312). After step S312, the process returns to step S311.

On the other hand, when the position is determined as being appropriate (step S311: YES), the inspection process unit 19 determines whether the direction of the flying device 10 is appropriate or not (step S321).

When the direction is determined as not being appropriate (step S321: NO), the flying process unit 18 adjusts the direction of the flying device 10 (step S322). After step S322, the process returns to step S321.

On the other hand, when the direction is determined as being appropriate (step S321: YES), the inspection process unit 19 performs the process for confirming a hitting position as described above (step S331).

Then, the inspection process unit 19 determines whether the impact unit 230 is able to make a contact with the location to be inspected 900 or not (step S332). When the impact unit is determined as being able to make a contact (step S332: YES), the inspection process unit 19 performs the hammering inspection (step S341). Then, the inspection process unit 19 transmits the result to the control device 31 via the flying-device-side communication unit 11 (step S342).

The process of FIG. 10 terminates after step S342.

On the other hand, when the impact unit 230 is determined as not being able to make a contact with the location to be inspected 900 (step S332: NO), the inspection process unit 19 performs an error process (step S351). For example, the inspection process unit 19 transmits the error to the control device 31 via the flying-device-side communication unit 11.

The process of FIG. 10 terminates after step S351.

Note that the flying device 10 may use a plurality of coordinates depending on a degree of freedom of the flying unit 100. This point is described with reference to FIG. 11 and FIG. 12.

Figure 11:
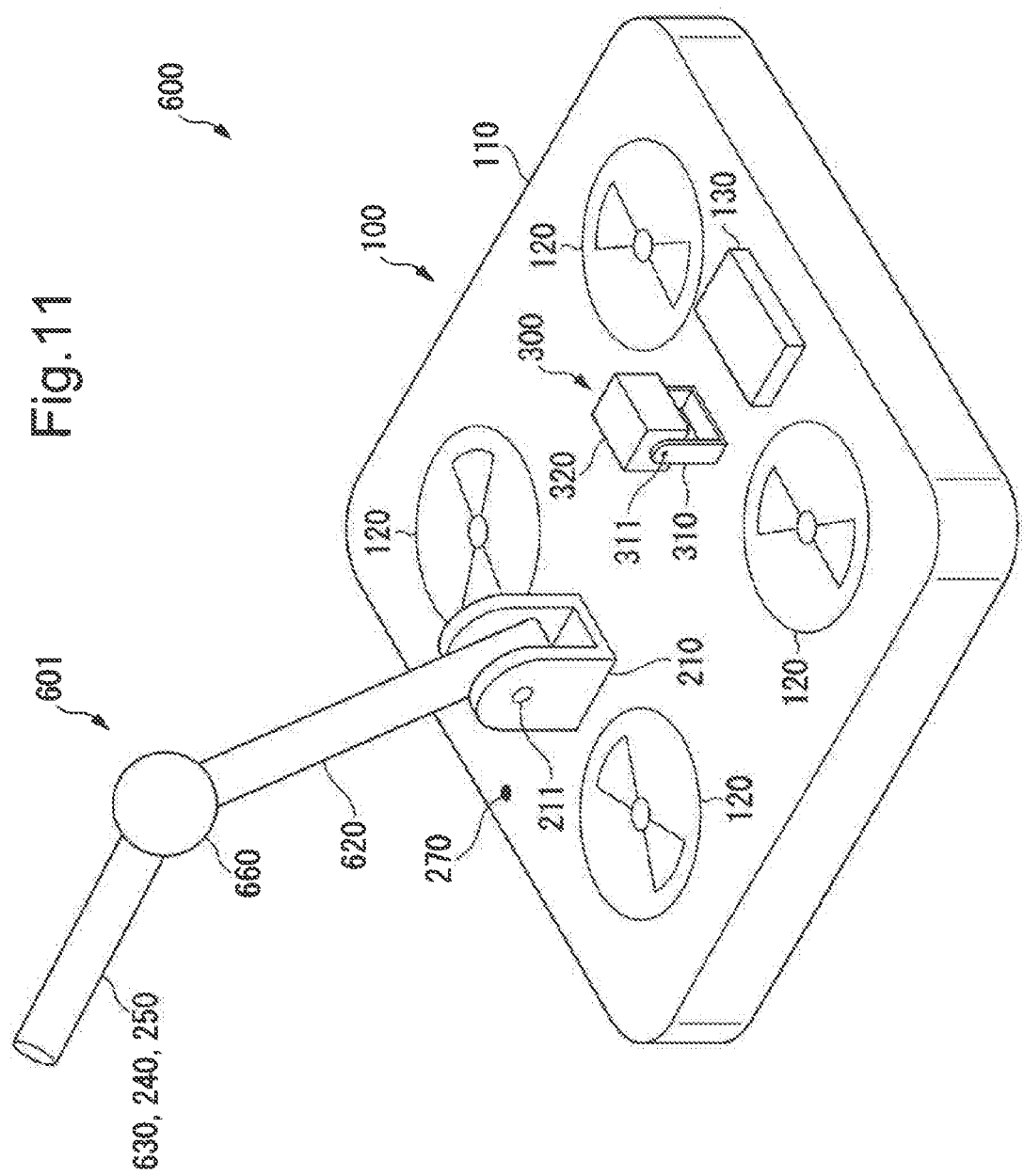
FIG. 11 is a perspective view illustrating a schematic external shape of the flying device according to the example embodiment including a hammering inspection unit having a higher degree of freedom.

FIG. 11 is a perspective view illustrating a schematic external shape of the flying device including a hammering inspection unit having a higher degree of freedom. The structure of the hammering inspection unit 601 of the flying device 600 illustrated in FIG. 11 is different from the case of the flying unit 100 (FIG. 2) of the flying device 10. The units other than the hammering inspection unit 601 are similar to the case of flying device 10.

In the flying device 600, the hammering inspection unit 601 includes an arm 620, an impact unit 630 and a joint unit 660, instead of the arm 220, the impact unit 230 and the balancer for inspection unit 260. The distance measuring unit 240 and the force sensor 250 are incorporated in the impact unit 630.

The joint unit 660 connects the arm 620 with the impact unit 630 at a variable angle. As a result, the impact unit 630 of the hammering inspection unit 601 has a higher degree of freedom than the impact unit 230 of the flying unit 100.

Figure 12:
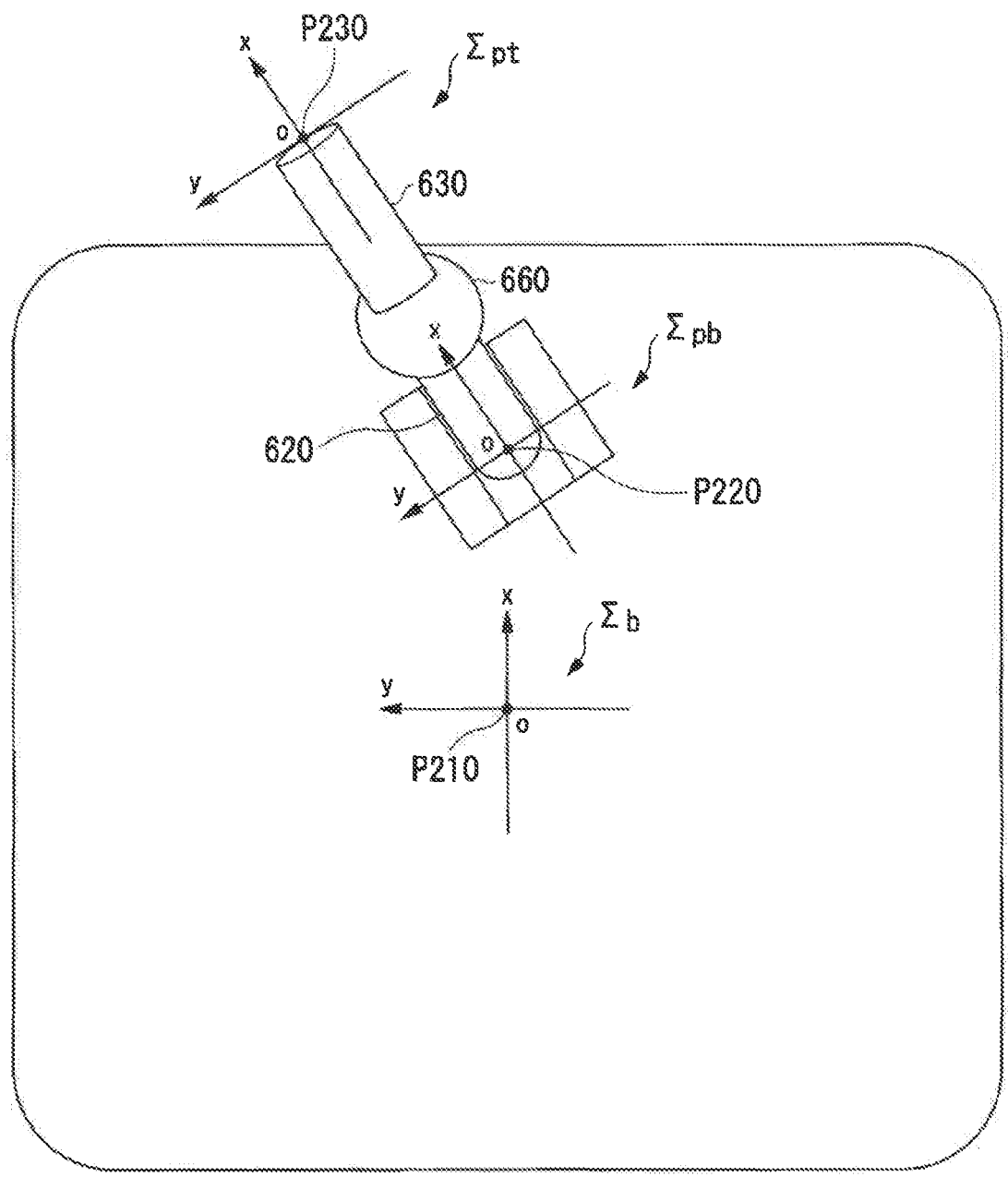
FIG. 12 is an explanatory diagram illustrating an example of a coordinate system used by the flying device according to the example embodiment.

FIG. 12 is an explanatory diagram illustrating an example of a coordinate system used by the flying device 600. In the example in the diagram, the flying device 600 uses coordinate systems $\Sigma_b$, $\Sigma_{pb}$ and $\Sigma_{pt}$.

The coordinate system $\Sigma_b$ of FIG. 12 is similar to the coordinate system $\Sigma_b$ of FIG. 5 to FIG. 7. In the coordinate system $\Sigma_b$ of FIG. 12, an origin is set to a gravity center of the flying device 600 (point P210). An x-axis is set to a forwarding direction of the flying device 600. A z-axis is set to an upward vertical direction, and a y-axis is set to be orthogonal to the x-axis and the z-axis. In the example of FIG. 12, the flying device 600 uses coordinate axes of right-handed coordinate system, however, the flying device 600 may use coordinate axes of left-handed coordinate system.

In the coordinate system $\Sigma_{pb}$, an origin is set to the connecting part (point P220) of the hammering inspection unit 601 and the flying device main body 110. An x-axis is set in a direction in which a longitudinal direction of the arm 620 is projected on a horizontal plane. A z-axis is set in the upward vertical direction, and the y-axis is set to be orthogonal to the x-axis and the z-axis. Also for the coordinate system $\Sigma_{pb}$, the flying device 600 uses coordinate axes of right-handed coordinate system, however, the flying device 600 may use coordinate axes of left-handed coordinate system.

In the coordinate system $\Sigma_{pt}$, an origin is set to a tip of the impact unit 630 (point P230). The tip makes a contact with the location to be inspected 900. An x-axis is set to be in a longitudinal direction of the arm 620, and a y-axis is set to be orthogonal to the x-axis and in the horizontal plane. A z-axis is set to be the direction orthogonal to the x-axis and the y-axis. Also for the coordinate system $\Sigma_{pt}$, the flying device 600 may use coordinate axes of right-handed coordinate system or coordinate axes of left-handed coordinate system.

The flying process unit 18 and the inspection process unit 19 selectively use the coordinate systems depending on an operation target. In addition, since the relation among the coordinates can be detected by an operation of a servo motor or a sensor, the flying process unit 18 and the inspection process unit 19 performs coordinate transformation when necessary.

As described above, the hammering inspection unit 200, 601 performs the inspection by hitting the location to be inspected 900 from a predetermined position relative to the location to be inspected 900. The flying unit 100 flies with the hammering inspection unit 200, 601 mounted on the flying unit 100. The ground-side device 20 is fixedly installed at a position relative to the location to be inspected 900, and detects a position of the flying device 10, 600. The flight instruction unit 592 controls the flying device 10, 600 in such a way that a forwarding direction of the flying device 10, 600 is a direction from the ground-side device 20 to the location to be inspected 900, based on the position of the flying device 10, 600 detected by the ground-side device 20.

As described above, since the flight instruction unit 592 performs the process for controlling the flying device 10, 600 in such a way that a forwarding direction is a direction to the location to be inspected 900, an inspection operator can perform the hammering inspection without operating the flying device 10, 600. In addition, since the flying device 10, 600 is used as the device for moving the hammering inspection unit 200, 601, the hammering inspection can be performed for the location where it is difficult for vehicles to enter.

The impact unit 230, 630 hits the location to be inspected 900. The inspection process unit 19 confirms a position relative to the location to be inspected 900 of the impact unit 230, 630 before the impact unit 230, 630 hits the location to be inspected 900 for inspection. Accordingly, the inspection system 1 can reduce a possibility of low precision of hammering inspection caused by hitting the location to be inspected 900 from an inappropriate position.

The force sensor 250 detects force applied to the impact unit 230, 630. The inspection process unit 19 moves the impact unit 230, 630 to a position for hitting the location to be inspected 900, and determines presence/absence of a contact between the impact unit 230, 630 and the location to be inspected 900, based on sensing data from the force sensor 250.

Accordingly, with the inspection system 1, whether the hammering inspection can be performed appropriately or not can be confirmed by an easy process of determining the presence/absence of detection of pressure using the force sensor 250.

The distance measuring unit 240 measures a distance between the impact unit 230, 630 and the location to be inspected 900. Then, the inspection process unit 19 determines whether the distance between the impact unit 230, 630 and the location to be inspected 900 is a predetermined distance or not.

Accordingly, with the inspection system 1, whether the hammering inspection can be performed appropriately or not can be confirmed by an easy process of determining whether the distance detected by the distance measuring unit 240 is the predetermined distance or not.

The flight instruction unit 592 accepts specification of two points on a surface of the location to be inspected 900, and controls the flying device 10, 600 in such a way that the forwarding direction of the flying device 10, 600 is a direction being orthogonal to a straight line including the two points and being from the ground-side device 20 to the location to be inspected 900.

As a result, the inspection operator simply needs to perform an easy process of specifying the two points on the surface of the location to be inspected 900 without operating the flying device 10, 600. The burden of the inspection operator can be reduced on this point.

Figure 13:
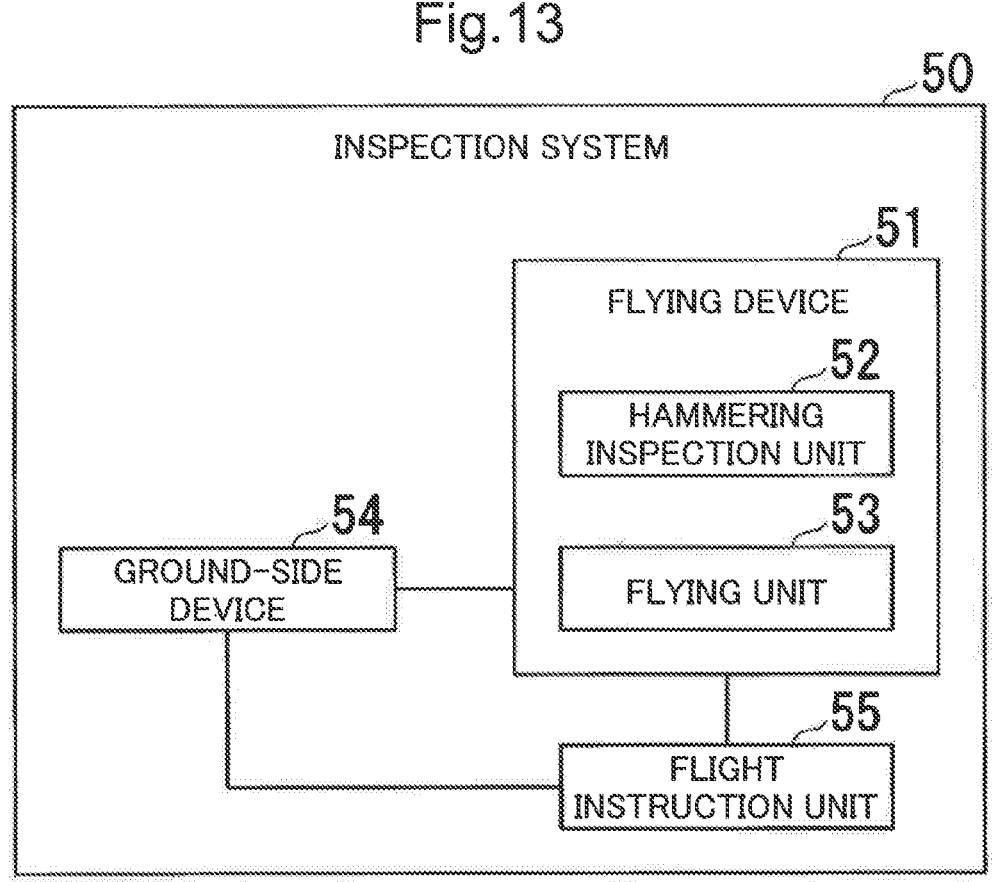
FIG. 13 is an explanatory diagram illustrating a minimum configuration of the inspection system according to the present invention.
Figure 14:
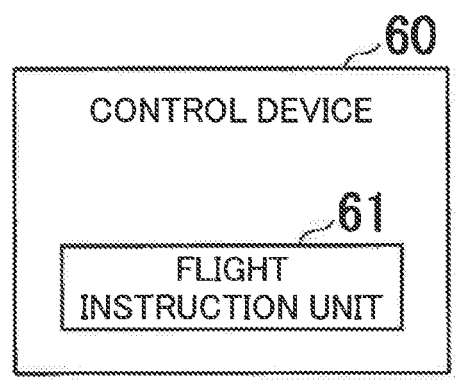
FIG. 14 is an explanatory diagram illustrating a minimum configuration of the control device according to the present invention.

Next, with reference to FIG. 13 to FIG. 14, the minimum configuration of the present invention is described.

FIG. 13 is an explanatory diagram illustrating a minimum configuration of the inspection system according to the present invention. The inspection system 50 includes a flying device 51, a ground-side device 54, and a flight instruction unit 55. The flying device 51 includes a hammering inspection unit 52 and a flying unit 53.

With the above configuration, the hammering inspection unit 52 performs an inspection by hitting a location to be inspected from a predetermined position relative to the location to be inspected. The flying unit 53 flies with the hammering inspection unit 52 mounted on the flying unit 53. The ground-side device 54 is fixedly installed at a position relative to the location to be inspected, and detects a position of the flying device 51. Then, the flight instruction unit 55 controls the flying device 51 in such a way that a forwarding direction of the flying device 51 is a direction from the ground-side device 54 to the location to be inspected, based on the position of the flying device 51 detected by the ground-side device 54.

As described above, since the flight instruction unit 55 performs the process for controlling the flying device 51 in such a way that the forwarding direction is a direction to the location to be inspected, the inspection operator can perform the hammering inspection without operating the flying device 51. In addition, since the flying device 51 is used as a device for moving the hammering inspection unit 52, the hammering inspection can be performed for the location where it is difficult for vehicles to enter.

FIG. 14 is an explanatory diagram illustrating a minimum configuration of the control device according to the example embodiment of the present invention. The control device 60 illustrated in the diagram includes a flight instruction unit 61.

With the above configuration, the flight instruction unit 61 controls, based on a position of a flying device detected by a ground-side device, the flying device in such a way that a forwarding direction of the flying device is a direction from the ground-side device to a location to be inspected. The flying device includes a hammering inspection unit that performs an inspection by hitting the location to be inspected from a predetermined position relative to the location to be inspected and a flying unit that flies with the hammering inspection unit mounted on the flying unit. The ground-side device is fixedly installed at a position relative to the location to be inspected and detects the position of the flying device.

As described above, since the flight instruction unit 61 performs the process for controlling the flying device in such a way that the forwarding direction is a direction to the location to be inspected, the inspection operator can perform the hammering inspection without operating the flying device. In addition, since the flying device is used as the device for moving the hammering inspection unit, the hammering inspection can be performed for the location where it is difficult for vehicles to enter.

The process of each unit may be performed by storing a program for realizing all or a part of the functions of the flying-device-side control unit 17, ground-side control unit 29 and controller-side control unit 590 on a computer readable storage medium, and by reading the program stored on the storage medium and executing the program by a computer system. Note that the "computer system" referred to herein includes OS (Operating System) and hardware such as a peripheral device.

The "computer readable storage medium" includes a portable storage medium such as a flexible disk, magneto-optical disk, ROM (Read Only Memory) and CD-ROM (Compact Disc Read Only Memory), and storage device such as a hard disk incorporated in a computer. The program described above may be a program for realizing a part of the above-described features, and may be a program that can realize the above-described features by combining with a program that is already stored in the computer.

While the present invention has been particularly shown and described with reference to drawings for the example embodiments thereof, the specific configurations are not limited to the embodiments. Various changes may be made without departing from the scope of the present invention.

This application is based upon and claims the benefit of priority from Japanese patent application No. 2016-106764, filed on May 27, 2016, the disclosure of which is incorporated herein in its entirety by reference.

REFERENCE SIGNS LIST 1, 50 Inspection system
10, 51, 600 Flying device
11 Flying-device-side communication unit
16 Flying-device-side storage unit
17 Flying-device-side control unit
18 Flying process unit
19 Inspection process unit
20, 54 Ground-side device
21 Ground-side communication unit
22 Flying device detecting unit
28 Ground-side storage unit
29 Ground-side control unit
30 Control system
31, 60 Control device
32 Power supply device
52, 200, 601 Hammering inspection unit
53, 100 Flying unit
55, 61, 592 Flight instruction unit
110 Flying device main body
120 Fan
130 Balancer for main body
210 Pedestal for inspection unit
211 Rotation shaft for inspection unit
220, 620 Arm
230, 630 Impact unit
240 Distance measuring unit
250 Force sensor
260 Balancer for inspection unit
270 Microphone
300 Laser range finder
310 Pedestal for finder
311 Rotation shaft for finder
320 Finder main body
400 Corner cube
510 Controller-side communication unit
520 Display unit
530 Operation input unit
580 Controller-side storage unit
590 Controller-side control unit
591 Coordinate management unit
660 Joint unit
900 Location to be inspected

What is claimed is:
1. An inspection system comprising:
a flying device configured to fly with a hammering inspector that is configured to perform an inspection by hitting a location to be inspected from a predetermined position relative to the location to be inspected, the hammering inspector being mounted on the flying device;
a ground-side device configured to detect a position of the flying device using a laser beam reflected by the flying device, the ground-side device being fixedly installed at a position relative to the location to be inspected; and a control device including:

a memory storing instructions, and one or more processors configured to execute the instructions to control, based on the position of the flying device detected by the ground-side device, the flying device in such a way that a forward direction of the flying device is a direction from the ground-side device to the location to be inspected by accepting specification of two points on a surface of the location to be inspected, calculating a flight path in order to match a forward direction of the flying device to a direction being orthogonal to a straight line through the two points and being from the ground-side device to the location to be inspected, determining a flight direction to be instructed to the flying device based on the determined flight path, and instructing determined flight direction to the flying device.

2. The inspection system according to claim 1, wherein the hammering inspector further includes a force sensor that detects force applied to the impact hammer, wherein an impact-hammer-position confirmer is configured to move the impact hammer to a position for hitting the location to be inspected, and determine the presence or absence of a contact between the impact hammer and the location to be inspected, based on sensing data from the force sensor.

3. The inspection system according to claim 2, wherein the hammering inspector further includes a distance sensor that measures a distance between the impact hammer and the location to be inspected, wherein the impact-hammer-position confirmer is further configured to determine whether the distance between the impact hammer and the location to be inspected is a predetermined distance or not.

4. A control method comprising:

controlling, based on a position of a flying device detected by a ground-side device, the flying device in such a way that a forward direction of the flying device is a direction from the ground-side device to a location to be inspected by accepting specification of two points on a surface of the location to be inspected, calculating a flight path in order to match a forward direction of the flying device to a direction being orthogonal to a straight line through the two points and being from the ground-side device to the location to be inspected, determining a flight direction to be instructed to the flying device based on the determined flight path, and instructing determined flight direction to the flying device, wherein the flying device is configured to fly with a hammering inspector that is configured to perform an inspection by hitting the location to be inspected from a predetermined position relative to the location to be inspected, the hammering inspector being mounted on the flying device, and wherein the ground-side device is configured to detect the position of the flying device using a laser beam reflected by the flying device, the ground-side device being fixedly installed at a position relative to the location to be inspected.

* * * * *